United States Patent [19]

Ghilardi

[11] Patent Number: 4,705,088
[45] Date of Patent: Nov. 10, 1987

[54] TREAD-PATTERNS OF MOTOR-VEHICLE TIRES
[75] Inventor: Giuliano Ghilardi, Milan, Italy
[73] Assignee: Pirelli Coordinamento Pneumatici S.p.A., Italy
[21] Appl. No.: 736,821
[22] Filed: May 22, 1985
[30] Foreign Application Priority Data
  Jun. 1, 1984 [IT] Italy ................. 21206 A/84
[51] Int. Cl.$^4$ ........................... B60C 11/12
[52] U.S. Cl. .................... 152/209 R; 152/DIG. 3
[58] Field of Search ........ 152/209 R, 209 D, DIG. 3; D12/136, 145, 143, 142

[56] References Cited
U.S. PATENT DOCUMENTS

| D. 208,014 | 6/1967 | MacWherter. | |
| 3,199,567 | 8/1965 | Kunz et al. | 152/209 R |
| 3,698,462 | 10/1972 | Jacobs | 152/209 R |
| 3,749,145 | 7/1973 | Hart et al. | 152/209 R |
| 4,031,938 | 6/1977 | Verdier | 152/209 R |
| 4,471,825 | 9/1984 | Kuhn et al. | D12/143 |

Primary Examiner—Michael Ball
Attorney, Agent, or Firm—Birch, Stewart, Kolasch and Birch

[57] ABSTRACT

A tread-pattern for tires, particularly for large-size tires destined for high-speed vehicles that have a great load-capacity. The tread-pattern is characterized by the presence of a plurality of circumferential zig-zag grooves that divide the tread-band into longitudinal ribs and by means of a plurality of sipes that divide the central ribs into a circumferential succession of blocks which the sipe-profiles render mutually indented one into the other. The profile is a broken line constituted by three successive segments of which the initial and final ones constitute the extension of a portion of the zig-zag development of the longitudinal grooves, while the central one presents a greater circumferential development than the corresponding development between the end-points of the sipe.

8 Claims, 2 Drawing Figures

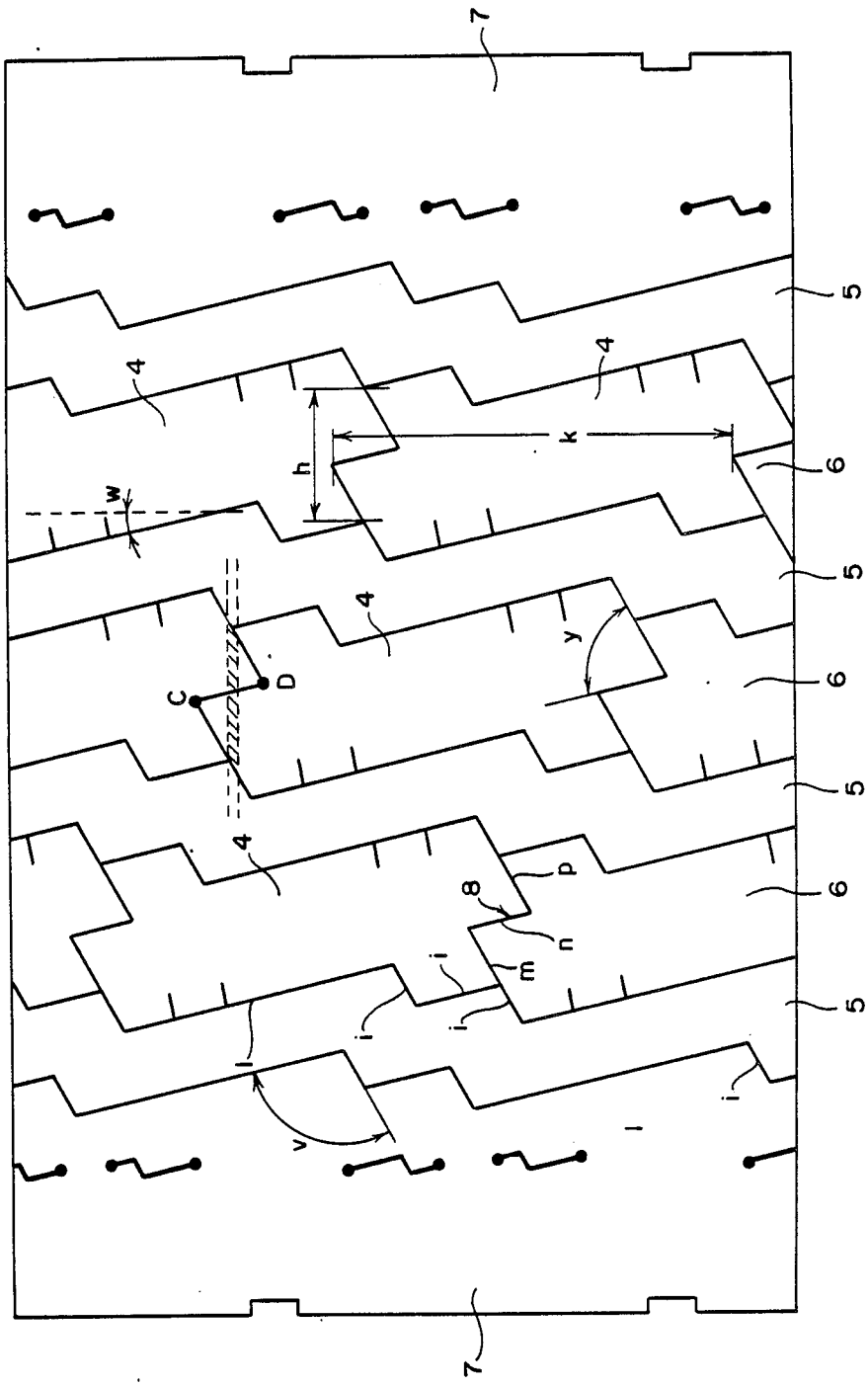

TREAD-PATTERNS OF MOTOR-VEHICLE TIRES

BACKGROUND OF THE INVENTION

The present invention relates to tread-patterns and, in particular, to the tread-patterns of large-size tires used for vehicle wheels having a high load-capacity and which are intended for travelling at high-speeds on roads that are under good condition.

It is already known that in the crown zone all tires present a thick elastomeric band extending from one type shoulder to the other, endowed with a pattern, referred to precisely as the tread-pattern, comprising grooves that are variously oriented in such a way as to subdivide the band into ribs and/or blocks which are reciprocally separated one from the other by the above grooves. Moreoever, in the thickness of the ribs and the blocks, there are generally made the so-called sipes i.e. narrow incisions, of a variable depth, that can even be equal to or greater than the groove depths, and which are directed from the upper surface towards the tire interior, and which can issue forth upon the sides of the ribs and the blocks.

The entire whole of the full and empty spaces created by the grooves and by the sipes, precisely constitutes the tread-pattern which goes to form the characteristic and distinct element of the tire, and which is above all variable in relation to the type of use the tire is destined for.

In tires for vehicles that develop high speeds during use, transverse grooves have preferably been avoided since they generate a considerable noise and a loss in the number of kilometers covered because they give rise to the phenomena of irregular wear which causes damage to the tire'treadband within a short period of time. Instead, the tires are usually countermarked by continuous, longitudinal zig-zag grooves having a low angle of inclination with respect to the circumferential direction, which divide the tread-band into a plurality of continuous circumferential ribs. These ribs are then supplemented by a more or less thick lamelling having the main purpose of rupturing the liquid-film found interposed between the road-surface and surfaces of the ribs, in such a way as to favor the direct anchoring of the rubber to the uneven roughness of the road, enhancing the road-holding characteristics of the tire, especially in cornering and on wet ground.

Nevertheless, even the lamels can turn out to be the cause of irregular tire wear with the result of seriously compromising the service-life of the tire.

In fact, when the rib during a straightaway running motion, traverses the ground-contact area, it is forced to modify its configuration from curvilinear to flat i.e. to modify its sectional profile in passing from the arc to the relative cord, and hence, undergoing a contraction in the longitudinal direction. Although this contraction is attenuated by the presence of the transverse lamel that permits an expanding of the rib or rather of the block, even in the longitudinal direction, it above all determines a swelling out i.e. a transversal expansion of the block, aggravated by the specific contact pressure, depending upon the value of the load bearing down upon the wheel.

This transveral expansion determines an outward slipping of the edges of the blocks, in a transverse direction. Here, sunken worn-out spots develop which attack the edges of the blocks, starting from the points that protrude most and from the sharpest corners, increasing progressively in dimension until completely covering the surfaces of the blocks and, in this way, seriously prejudicing not only the distance in kilometers covered, but also the very riding comfort since vibrations in the structure of the vehicle itself are induced whenever the tire comes into contact with road or ground.

In order to lessen the defects caused by the presence of the lamels per se, on the ribs lamels are provided that are inclined with respect to the direction of running, for distributing in the longitudinal direction all the phenomena accompanying specific pressure and sliding, that originate in the zone of the ground-contact area.

Nevertheless, this type of lamel introduces a further defect constituted by the fact that it behaves as a relative sliding plane for the two contiguous blocks, because of the reciprocal pressure to which the edges of the two blocks are subjected, under the ground-contact area.

This situation creates a relative longitudinal sliding between the two opposite facing blocks, that is a further cause for giving rise to an irregular wearing starting from the opposite facing edges and moving towards the main grooves i.e. substantially speaking, from points where the transverse lamels open out into the longitudinal grooves.

OBJECTS AND SUMMARY OF THE INVENTION

It has now been determined that by designing the transverse lamels in an appropriate manner, combined with a suitably apt longitudinal profile for the ribs, it is possible to eliminate or to lessen to quite a satisfactory extent, all of the previously mentioned defects, while attaining considerable improvement particularly with regard to the distance in kilometers covered, to the tendency towards irregular wearing of the tire, the riding comfort and the roadholding behavior when cornering and on wet roads.

Hence, the aim of the instant invention is a new tread-pattern provided with a special type of lamel which, apart from rupturing the liquid-film present on the road, at the same time, whenever the tire is subjected to strong tangential stresses such as when braking or when drifting off course during a straight run, guarantees the reciprocal locking of the two blocks divided by the lamels by preventing any sliding of the edges of the blocks and hence, the possibility of any irregular wear of the tire.

Hence, what constitutes an object of the present invention is a tire for vehicle wheels, comprising in the crown zone, a tread-band that is axially extended from one sidewall to the other of the tire, and between which there is impressed a pattern that comprises a plurality of circumferential zig-zag grooves delimiting a plurality of ribs, the two axially outer ribs being circumferentially continuous with at least one axially inner rib being subdivided into a series of circumferential blocks separated from one another by a continous transverse lamel that extends from one side of the rib to the other and opens out into both the grooves that delimit the rib, characterized by the fact that the circumferential zig-zag line that delimits each rib is constituted by the periodic succession of one long side, inclined with respect to the circumferential direction of the tire, and at least one short side, of a length not greater than 35% of the long side, and disposed substantially perpendicular to the latter, and that the lamel separating the two contiguous blocks from each other, has a broken-line lay-out that is constituted by three successive segments, in the central straight segment extending between two points, at least one of which lies outside of the circumferential interval delimited by the pair of axial straight lines that pass through the points where the lamel opens into the grooves.

According to a particular embodiment of the invention, the circumferential zig-zag line that delimits each rib, is constituted by the periodic succession of one long side and three short sides, the lamel extending axially between the two vertices respectively created by the meeting of two short-sides on each sidewall, the long-side being inclined with respect to the circumferential direction of the tire, according to an angle of not greater than 30°, the angle formed between two consecutive sides of the circumferential zig-zag line being between about 80°-100°.

In combination with the zig-zag configuration, the central segment of the broken-line constituting the lamel has a length of not less than 25% of the axial extension. Preferably, the two end segments of the broken-line constitute the extension of one of the short-sides, while the angle formed by two consecutive segments of the broken-line is at least equal to 30°.

As for the dimensions of the lamels, their depth is at least equal to 60% of the depth of the circumferential grooves, while their width does not exceed a value of 3 mm. Further, the segments of the broken-line constituting the lamel, need not be of the same width.

BRIEF DESCRIPTION OF DRAWINGS

The present invention will be better understood with the aid of the description given herebelow, and from the attached figures, given solely for the purpose of illustrating but not limiting the present invention whereby:

FIG. 2 illustrates a form of a further embodiment for the tread-pattern of the present invention.

DETAILED DESCRIPTION

Figure 1:
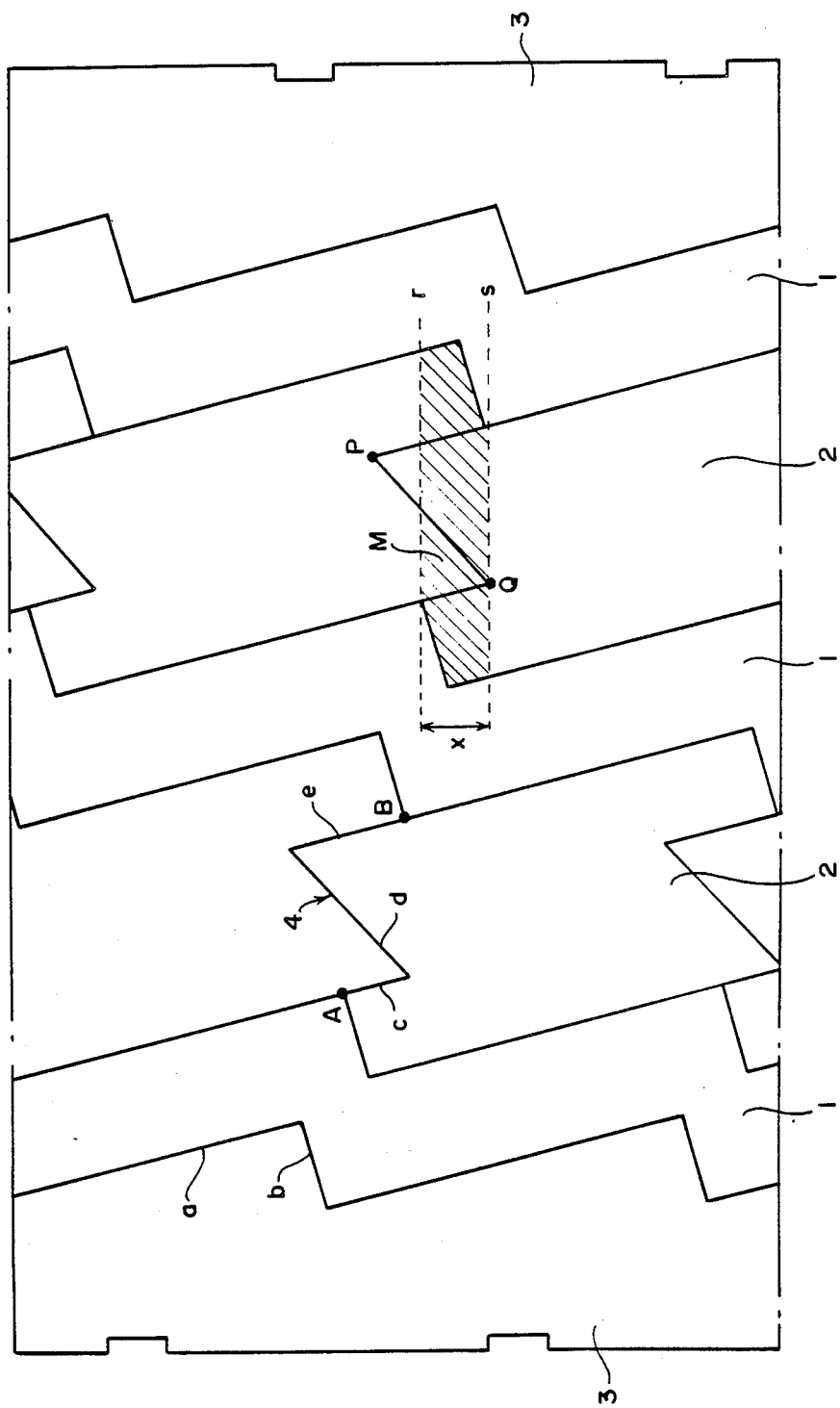
FIG. 1 illustrates, in a more general way, the principle of practicing the present invention.

Referring now to FIG. 1, there is illustrated a limited circumferential portion of the tread-pattern of the invention, which is nevertheless repeated, cyclically and identically, about the entire circumference of the tire. This pattern comprises three circumferential grooves 1, that delimit two central ribs 2, substantially of the same width, and shoulder ribs 3 in an axially outer position, which present their axially inner sidewall shaped according to a zig-zag configuration, substantially parallel to that of the adjacent rib's side.

The configuration is constituted by the periodic succession of a side "a" that we shall define as being "long", and a side "b" that we shall define as being "short", since the short-side has a length not exceeding 35% of the length of the longside. Moreover, the two central ribs 2 are subdivided into a plurality of circumferentially disposed blocks, created by a series of transverse lamels 4, each constituted by three segments "c", "d", and "e", of which the two lateral segments "c" and "e" depart from the meeting-points A and B, respectively between the longside and the short-sides of the rib, in the zone where a convex angle lies, corresponding to the rib's interior.

It can be noted that this type of transverse lamel, that is disposed in the manner indicated and coupled with the particular type of zig-zag profile of the ribs, creates an indentation between two contiguous blocks, which is such as to quite easily bear the transverse thrusts and to impede any relative movement between the contiguous blocks in the transverse direction.

In the version shown in FIG. 1, each lamel connects the two vertices, on the opposite sides of the ribs, that are circumferentially closest together. If from each of these vertices, we should now draw a line that is transverse and parallel to the tire axis, respectively "r" and "s", these two axial lines will be found to delimit a circumferential space "M" on the rib (bounded by the broken-lines in the figures), having a circumferential distance "x". It can easily be noted that the central segment "d" of the transverse lamel is positioned between two points "P and Q" of which the point "P" is external to the space; consequently the circumferential distance "P Q" results such as to guarantee the effect of a reciprocal locking of the contiguous blocks.

This solution idea of the problem has been further developed and elaborated in the pattern shown in FIG. 2 that illustrates a preferred form of embodiment for the tire of the invention. This pattern comprises four circumferential grooves 5, that delimit three circumferential central ribs 6, all substantially of the same width, and two shoulder ribs 7 i.e. in an axially outer position, which present their axially inner side shaped in a zigzag configuration, as well as parallel to corresponding sides of the adjacent rib. This zig-zag configuration results as being constituted by the periodic succession of a long-side "1" followed by three short-sides "i". The definitions of the long and short sides are as already specified above for illustrating previous FIG. 1. In other words, what are defined as "short-sides" are those sides having a length not exceeding 35% in length of the longest of the sides definining the trajectory of the zig-zag configuration.

All of the short-sides present approximately the same lengths, and all of the sides are substantially perpendicular to one another i.e. reciprocally inclined according to an angle "v" of between 80° to 100° and herein represented equal to about 95°. Moreover, the long sides are inclined with respect to the circumferential direction of the tire, according to an angle "w" not greater than 30° and preferably between 5° and 20°. In FIG. 2 it is represented at about 18°.

It can be noted that the inclination of the longsides i.e. the value of the angle "w" can vary, within the limits fixed, while passing from one rib to the next, and even within the gambit of the same rib.

The central ribs are further divided into a plurality of blocks through the means of thin transverse lamels 8 that open out onto both sides of each rib. The configuration of these lamels can be quite varied within the scope of this invention. According to the particular and preferred version of the designs shown in the figure, where the development of these lamels is constituted by a broken-line comprising three tracts "m, n, p", the initial tract "m" and the end tract "p" constitute the extension of the short-sides as disposed perpendicularly on the long side, the opening points of the lamels into the longitudinal grooves that delimit the rib being constituted by the meeting point of two short contiguous sides. In this version, the central tract "n" of the grooves, extends between two points C and D both lying outside the circumferential space (drawn in the figure) already described with regard to FIG. 1. This is a preferred condition since, as already stated, it is essential for just one of the points to lie outside the above-mentioned space. Moreover, the points in the lamel for issuing forth into the grooves could also be found on the same axial line. In this case no such circumferential space would exist any more and in such an eventuality the points C and D will preferably lie on opposite sides of the axial line.

In any case, no matter what the particular version may be of the design realized, the length of the tract C-D will be almost equal to the length of the shortest of the short-sides; and it will moreover have a circumferential length of not less than 25% of the axial distance "h". Preferably, it will have to extend in the circumferential direction for at least 5 mm beyond the length of the corresponding circumferential space.

The depth of the transverse lamels 8 is equal to the depth of the circumferential grooves 5 that delimit the ribs. However, it must not be less that 60% of their depth; whereas the width of each lamel, in the circumferential direction, is equal for all three segments "m, n and p", and equivalent to 3 mm. This value is a maximum one and must never be exceeded, whereas the equality in the widths of the three segments constituting the lamels, is absoutely a preferential condition. All the values stated, have moreover to be understood as measured on a tire that is already mounted on its rim and inflated to the pressure of use.

The angle "y" formed by two contiguous segments of the lamel, has a value that is equal to at least 30°, whereas the circumferential distance "k" between two successive lamels delimiting a block, has to be between one-half the axial development "h" of the lamel and six times the said value "h".

The tire of the invention has shown to possess qualitative characteristics that are clearly superior to those found in the known tires. Moreover, it has solved, for the most part and to a satisfactory degree, those problems concerning the tendency of the tire to have a precocious and irregular wearing-out, in addition to improving the ride-comfort and road-holding of the tire, particularly during cornering, not just on dry ground, but more particularly on wet terrain. In fact, it has been determined during the course of many diverse tests carried out, that on slippery surfaces having a frictional coefficient (between ground and the tire) equal to 0.2/0.3, the tire of the present invention gains considerably with respect to its road-holding capactiy, in comparison to the best-known tires. This gain has been determined to be between 30% to 50% with respect to the tires without lamels, having similar patterns.

Without this being bound by the following it is suggested that these advantages and improvements may depend upon the following circumstances. In the first place, the choice of the values for the width of the lamels, combined with optimum values for the inter-distance of the lamels, and hence of the circumferential development of the blocks, probably compensates, in an optimum manner, for the contracting of the block under the ground-contact area hence, minimizing the entity of the marginal slidings which are the primary cause of originating irregular wear of the tire. In the second place, the combination between the special zig-zag profile of the rib and the broken-line configuration which, for that matter is only present on the central ribs, confers to the blocks a substantially solid configuration in any zone whatsoever i.e. devoid of portions characterized by very sharp corners, but along with a high longitudinal flexibility that compensates for the diversity in development of the rolling circumference of the tire with respect to its center and upon its shoulders and therefore, minimizing any relative longitudinal slidings between the various circumferential portions of the treadband.

At the same time, the particular design of the lamels, combined with their thickness and under the effects of the relative thrusts on the margins respectively facing the two contiguous blocks, determine the compactness of the two blocks through the lamel and a reciprocal indenting that blocks any lateral shifting relative to the blocks, while rendering the rib to be more stably fixed during a straight run, as well as under the effects of the drifting thrusts. This stability is reflected to advantage, particularly with regard to the driving and road-holding characteristics of the tire, but also with regard to the wearing-out of the tread, especially when cornering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. In a tire for vehicle wheels, comprising first and second sidewalls, a crown zone having a tread band that axially extends from said first sidewall to said second sidwall of said tire, said tread band having impressed thereon a pattern that comprises a plurality of circumferential grooves bounded by a pair of circumferential zig-zag lines having a depth delimiting at least two outer and one inner ribs, said circumferential zig-zag lines that delimit each rib comprising a periodic succession of long and short sides inclined with respect to the circumferential direction of said tire and disposed substantially perpendicular to each other, the two axially outer ribs being circumferentially continuous, and at least one axially inner rib being subdivided into a series of circumferential blocks separated by a continuous transverse lamel that extends from one to the other side of said rib, between two vertices created by the meeting of two contiguous sides on each flank, and opens out into said grooves that delimit said rib, the improvement wherein said circumferential zig-zag line that delimits each rib comprises a periodic succession of one long side inclined with respect to the circumferential direction of said tire according to an angle having a value of not exceeding 30° and three short sides, each having a length not greater than 35% of said long side, said lamel having a broken lay-out that extends between vertices created on each flank of the rib by the meeting of two short contiguous sides, and having a broken-line lay-out that comprises three successive straight segments, two lateral segments each constituting the extension of the short side, as disposed perpendicularly on the long side, and a central segment extending between two points at least one of which lies outside of a circumferential interval delimited by a pair of axial straight lines each passing through a point where said lamel opens into said grooves, the lamel having a depth equal to at least 60% of the depth of said circumferential grooves.

2. A tire according to claim 1, wherein said long side is inclined, with respect to the circumferential direction of said tire, according to any angle having a value between 5° and 20°.

3. A tire according to claim 1, wherein an angle formed between two contiguous sides of said circumferential zigzag line, has a value within the range of from about 80°–100°.

4. A tire according to claim 1, wherein said central segment of said broken-line constituting said transverse lamel has a length not less than the shortest of said shortsides, and a circumferential extension that is not less than 25% of the axial extension of said lamel.

5. A tire according to claim 1, wherein said lamels have a width not exceeding 3 mm.

6. A tire according to claim 5, wherein at least two segments of said broken-line constituting said lamel have widths that are diverse from one another.

7. A tire according to claim 1, wherein an angle formed by two consecutive segments of said broken-line is equal to at least 30°.

8. A tire for vehicle wheels, comprising first and second sidewalls, a crown zone having a tread-band that axially extends from said first sidewall to said second sidewall of said tire, said tread-band having impressed thereon a pattern that comprises a plurality of circumferential zig-zag grooves bounded by a pair of circumferential zig-zag lines having a depth delimiting a plurality of ribs, two axially outer ribs being circumferentially continuous, and at least one axially inner rib subdivided into a series of circumferential blocks separated from one another by a continuous transverse lamel that extends axially from a first side of said at least one axially inner rib and opens out into said grooves that delimit said rib, wherein said circumferential zig-zag lines that delimit each rib comprise a periodic succession of one long side inclined with respect to the circumferential direction of said tire forming an angle of at most 30°, and three short sides each of a length not greater than 35% of said long side and disposed substantially perpendicular to said long side and wherein said lamel separating two respective contiguous blocks of said series of circumferential blocks from each other has a broken-line lay-out that comprises three successive straight segments, two lateral segments each constituting an extension of the short side, as disposed perpendicularly on the long side, and a central straight segment which extends between two points, at least one of which lies outside of a circumferential interval delimited by a pair of axial straight lines each passing through a point where said lamel opens into said grooves, the lamel having a depth equal to at least 60% of the depth of said circumferential grooves.

* * * * *